Aug. 2, 1966  K. W. KLENE ETAL  3,263,821

SHELF ASSEMBLY

Filed Dec. 11, 1964  3 Sheets-Sheet 1

United States Patent Office 3,263,821
Patented August 2, 1966

3,263,821
SHELF ASSEMBLY
Kenneth W. Klene, Bedford, and Maximilian Schirmer, Goffstown, N.H., assignors to Hermsdorf Fixture Manufacturing Company, a division of Camden Industries Company, Inc., Manchester, N.H., a corporation of Delaware
Filed Dec. 11, 1964, Ser. No. 417,634
7 Claims. (Cl. 211—148)

This invention relates to store display equipment used as merchandising fixtures and more particularly pertains to certain structural features of gondola assemblies employed in the erection of such fixtures and the related shelf-supporting assemblies and accessory items used thereon.

In the field of store display cabinets, counters, and other such merchandising fixtures, there is a need for an assembly of structural components which provides a rigid, unitary supporting framework which will carry the necessary shelving and load capacity for goods display. There is also a requirement that these components be easily assembled and disassembled in order to provide for ease of mobility in relocating such fixtures. As used in this disclosure, the term "gondola" assembly is intended to cover the basic structural supporting unit to which shelving or other accessories may be appended, as desired.

The prior art discloses many forms of such structural shelving or gondola assemblies, however, these generally depend upon using a multitude of separate fastening means for assembly and disassembly such as screws, nuts, and other conventional connectors. The need for such connectors presents many disadvantages in that an assembly or disassembly of components requires the need for tools; it requires time to screw or unscrew various bolts which may easily become lost and this possibility of loss in turn requires that a supply of such fasteners be maintained which in turn engenders undesirable expenses of inventory and stock control.

The present invention overcomes these prior art disadvantages by providing a gondola assembly which does not require the use of separate conventional fasteners but instead employs certain novel interlocking features which results in a rigid unitary structure possessing unique versatility long desired by the merchandising fixture manufacturing and retail trade industry.

It is, accordingly, among the objects of this invention to provide a shelf-supporting gondola assembly which can be erected to form a rigid structure without employing the many connectors and fastening devices of the prior art assemblies.

It is another object of this invention to provide a gondola assembly of interlocking components which can be erected and dismantled with relative ease and thereby provide a significant degree of mobility heretofore not present in the merchandising fixture art.

A further object of this invention is to provide components for a shelf-supporting gondola assembly which are readily and economically manufactured and may be easily interchanged with one another to provide for changes in size or shape of the assembly, as desired.

Other objects and many of the attendant advantages of this invention will be readily appreciated as the same becomes better understood by references to the following detailed description when considered in connection with the accompanying drawings in which like reference numerals designate like parts throughout the figures thereof and wherein.

Figure 1:
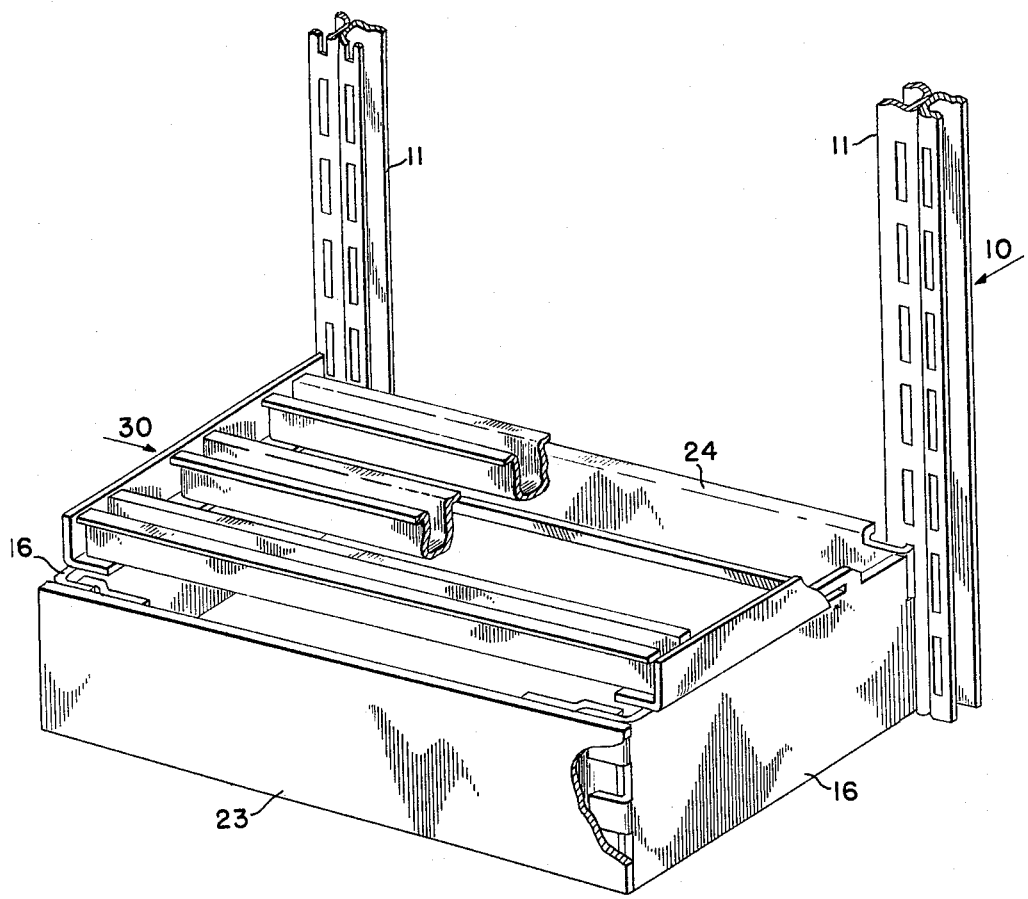
FIGURE 1 illustrates a partially sectioned perspective view of a typical gondola assembly employing this invention.

Referring now with greater particularity to FIGURE 1, there is shown in perspective view a typical gondola assembly 10 comprised of a pair of spaced apart vertical uprights 11 each of which has extending outwardly therefrom a base-end 16 having their front end portions interconnected by a base-front member 23. The uprights 11 are interconnected by a stretcher member 24 in a substantially coplanar relationship therewith which not only interconnects uprights 11, but also serves to engage in interlocking relation with tabs 18 (see FIGURE 3) of base-ends 16 which are also in engagement with uprights 11. Lying across the tops of base-ends 16 and interconnected thereto is a deck frame 30 suitably fastened thereto in a manner hereinafter disclosed. The inter-relation of these elements coupled with the structural features inherent in each of the component designs achieves a combination of rigidity coupled with ease of assembly and disassembly not previously available in prior art devices.

Figure 2:
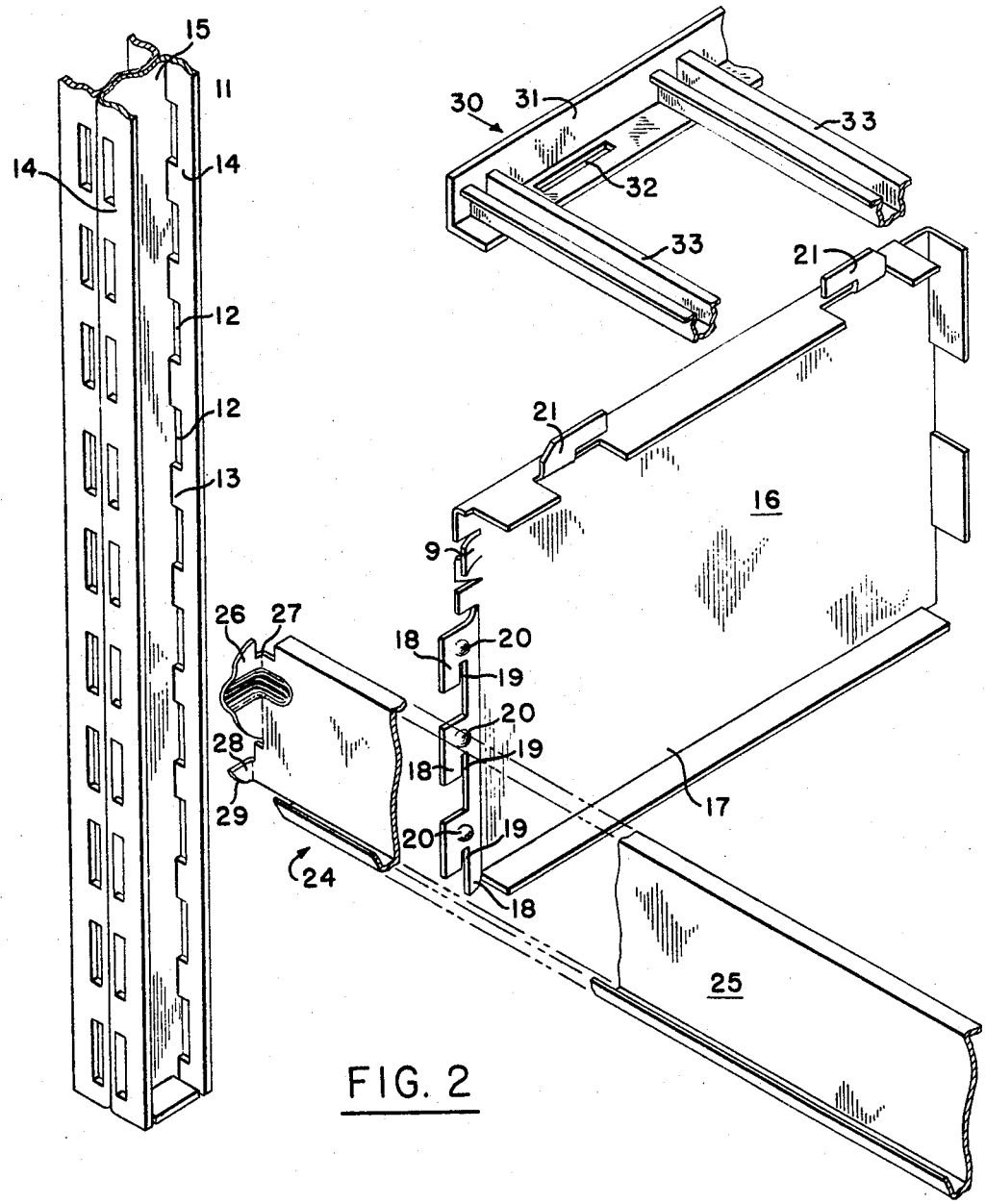
FIGURE 2 illustrates an enlarged exploded partial rear view of one end of the assembly depicted in FIGURE 1.

In order to better understand the various structural features of this invention and the inter-relation of the components, reference is now had to the drawings illustrating some of these components in greater detail. Included in FIGURE 2 is an enlarged partial perspective view of stretcher member 24 having an elongated body portion 25 with a pair of right angularly disposed tabs 26 and 28 located at each end thereof. Tab 26 is separated from tab 28 a predetermined distance dependent on the particular size of uprights 11 and the spacing between its apertured openings 12.

Each tab 26 carries a recess 27 at the end adjacent body portion 25, in order that it may peripherally engage with cross-member 13 of uprights 11. Tab 28 has its end-edge 29 configured in a curve to permit employing the assembly techniques hereinafter disclosed.

Again referring to FIGURE 2, there is shown in greater detail a base-end 16 comprising a body portion 17 and a plurality of tabs 18 in spaced apart relation along one edge thereof. Each of tabs 18 is substantially a coplanar extension of body portion 17 and features an undercut 19 adjacent thereto. Undercut 19 is dimensioned so as to peripherally engage with cross-member 13 of upright 10. As seen from FIGURE 2, each of tabs 18 carries a dimpled protrusion 20 along its side surface which permits slidable, frictional engagement with uprights 11 when assembled therewith. Located above tabs 18 is a projection 9 bent inwardly out of the plane of body-portion 17. This projection 9 will forcibly abut against the outer surface of stretcher 24 when assembled therewith in a manner hereinafter disclosed.

The top edge portion of each base-end 16 carries a pair of locking tabs 21 whose assembly function is further described hereinbelow.

Upright 11, of conventional sheet metal construction of suitable gauge, has a generally channel-shaped cross-section wherein two flange portions 14 are interconnected at their respective longitudinal edges by a suitably dimensioned web 15. In the illustrative embodiment, two such uprights are shown attached in back to back relation. Each of the flanges has a plurality of correspondingly spaced-apart, opposed elongated apertures 12. Each of these apertures is dimensioned and spaced apart so as to be able to receive tabs 18 carried by base-end 16 when presented for assembly.

FIGURE 2 also depicts a partial view of deck-frame 30 each end of which is comprised of an angle-shaped end portion 31 interconnected by a series of rigid, longitudinal channel members 33, the channel configuration of members 33 being preferred for its inherent rigidity. Each of end portions 31 carries a pair of slots 32 adapted to receive the locking tabs 21 of base-end 16.

In the assembly of these components, each of the base-ends 16 is attached to upright 11 by inserting tabs 18 through corresponding apertures in the upright 11 sufficiently far enough to permit undercut portion 19 to engage with cross-member 13 of the upright, thereby resulting in locking the base-end and upright together against horizontal separation. It is to be noted also that the bottom edges of base-end 16 and upright 11 are coplanar when assembled together, thereby providing for uniform distribution of any subsequent load weights imposed on the structure.

Figure 3:
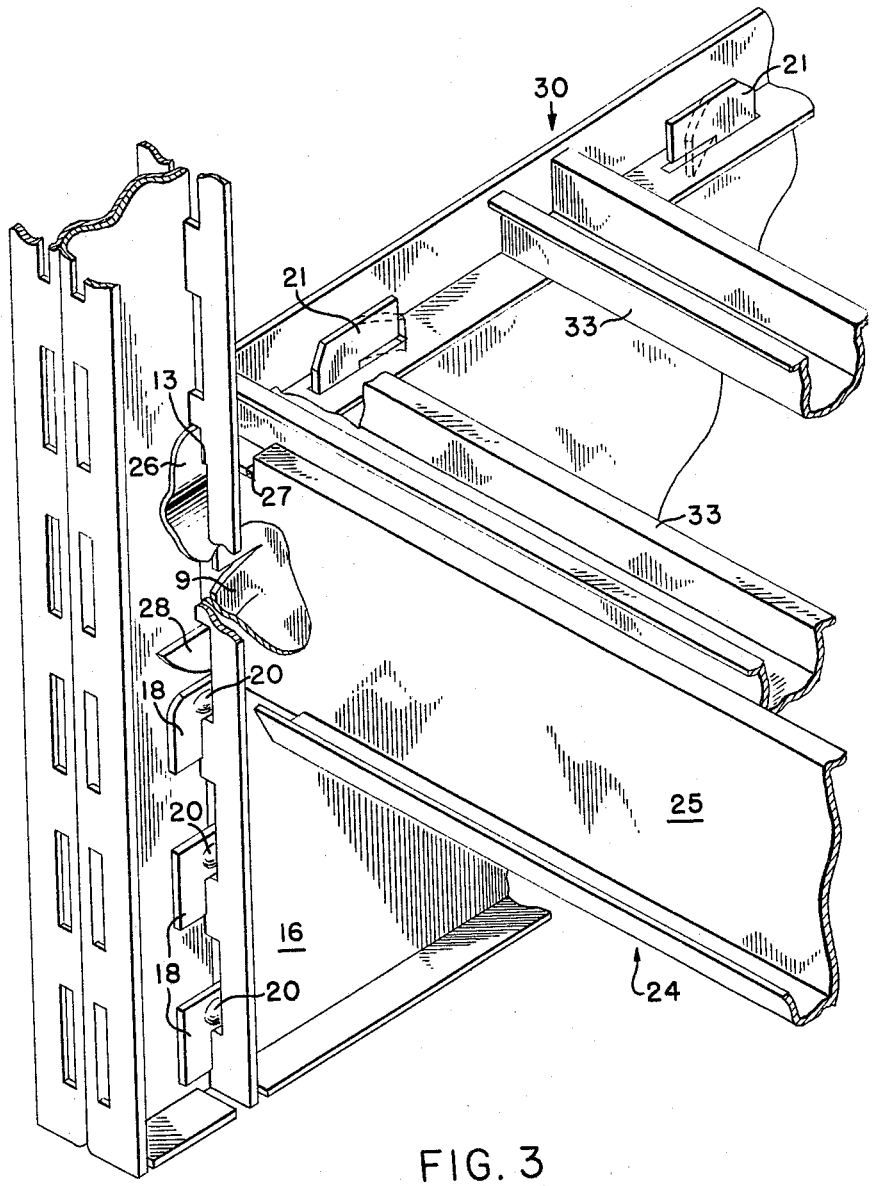
FIGURE 3 illustrates an assembled view of the components shown in FIGURE 2.

In order to prevent base-ends 16 from moving vertically, relative to the uprights, while also being interconnected therewith to maintain them in a predetermined spaced apart relation, stretcher-member 24 is next assembled into position. Referring to FIGURE 3, this stretcher-member is initially positioned in an oblique manner so as to have recessed portion 27 engaged with the lower portion of cross-member 13; then using this point of engagement as a fulcrum and forcibly rotating tab 28 of stretcher-member 24 into frictional engagement with tab 18 the components will engage with one another and assume the position depicted by FIGURE 3 in which the mutually contacting surfaces of cross-member 13 with tab 26, and tabs 18 with 28 against their adjacent respective cross-members 13 are interlocked to prevent any substantial degree of relative vertical movement therebetween.

As stretcher 24 is rotated into position, it resiliently displaces projection 9 which then resumes its position by springing into place behind stretcher 24 against the face of body portion 25, as depicted in FIGURE 3.

As also seen in FIGURE 3, tab 18 carries an indentation 20 which protrudes from the side thereof so that when stretcher 24 is rotated into position, the indentation 20 and the opposed surface of tab 18 will be in frictional engagement with the respective adjacent surfaces of the apertures 12 in upright 11.

Base front 23 is attached to the front ends of base-ends 16 in slidable frictional engagement (shown in FIGURE 1) to hold these ends in substantially rigid spaced apart relation.

To complete the gondola assembly, deck frame 30 is placed in position whereby lock tabs 21 of base-ends 16 slip through slots 32 of the deck frame. Bending lock tabs 21 horizontally (as shown by the dotted line position) with a screw driver or pliers will effectively secure the deck frame and base-ends together into a unitary relation. Pegboard or other suitable material can then be laid on the deck frame to complete the shelving.

The supporting structure resulting from this assembly is, by virtue of the disclosed interlock-relationship of the components, rigid and easily assembled and disassembled. Shelving material installed in a conventional manner on the deck frame is placed there with the assurance that the load supporting elements of the assembly will always remain intact. Because of the absence of screws, nuts, pins, and other forms of fastening devices, the interconnectioned joints will not be adversely affected by vibration which in the case of threaded bolt-type fasteners may become loosened. Further, because the interlocking fasteners are an integral part of the components themselves, this serves to materially reduce costs of production, assembly, and disassembly and assure interchangeability of components at all times.

The foregoing describes a preferred embodiment of the invention, however, it is to be understood that various changes in the details, materials, steps and arrangements of parts, which have been herein described and illustrated in order to explain the nature of the invention, may be made by those skilled in the art within the principle and scope of the invention as expressed in the appended claims.

What is claimed and desired to be covered by Letters Patent of the United States is:

1. An assembly for store display fixtures comprising: a pair of spaced apart apertured, vertical side-posts; an end-member having a plurality of locking hooks on one end thereof which are engaged into corresponding apertured portions of each side-post; a stretcher member interconnecting the side-posts, said member carrying first and second locking tabs at each end thereof, each of said first locking tabs forcibly abutting against one of the aforesaid locking hooks on each of the end-members, and each of said second locking tabs forcibly engaged against the corresponding apertured surface of each side-post.

2. The apparatus set forth in claim 1 wherein each end-member carries a pair of bendable upstanding tabs on its upper edge; and support means fastened to and extending between the aforesaid end-members, said support means carrying corresponding apertured sections for receiving said tabs, whereby when said tabs are forcibly displaced in a horizontal direction, the support means becomes integrally locked to said end-members.

3. A merchandizing display fixture superstructure assembled with a plurality of interlocking components, comprising: a pair of spaced apart vertical side-ports with a plurality of apertures therein; a pair of end-members carrying a plurality of hook tabs along one edge thereof each engaged in corresponding apertures in each of said side-posts, each member carrying on its upper edge a pair of locking tabs; a stretcher member interconnecting the side-posts, said member carrying right angularly disposed first and second locking tabs at each end thereof in predetermined spaced apart relation, each of said first locking tabs being in substantial abutting relation against one of the aforesaid hook tabs on each of the end-members, and each of the second locking tabs being in substantial frictional engagement against the corresponding apertured surface of each side-post.

4. The apparatus set forth in claim 3 wherein each end-member carries a pair of bendable upstanding tabs on its upper edge; and support means fastened to and extending between the aforesaid end-members, said support means carrying corresponding apertured sections for receiving said tabs, whereby when said tabs are forcibly displaced in a horizontal direction, the support means becomes integrally locked to said end-members.

5. An assembly for store display fixtures comprising: a pair of spaced apart vertical side-posts; and end-member in interlocking relation with each side-post and extending therefrom; stretcher means interconnecting said side-posts and forcibly interlocking said side-posts and said end-members together; resiliently displaceable means carried by each end-member in substantially abutting relation against the aforesaid stretcher means; and support means fastened to and extending between the aforesaid end-members.

6. An assembly for store display fixtures comprising: a pair of spaced apart apertured, vertical side-posts; an end-member having a plurality of locking hooks on one end thereof engaged with corresponding apertures of each side-post; a stretcher-member interconnecting the side-posts, said member carrying first and second locking tabs at each end thereof, each of said first locking tabs forcibly abutting against one of the aforesaid locking hooks on each of the end-members, each of said second locking tabs forcibly engaged against the corresponding apertured surface of each side-post; resiliently displaceable means carried by each end-member in substantially abutting relation against the aforesaid stretcher member; and support means mechanicaly interlocked to and extending between the aforesaid end-members.

7. A merchandizing display fixture superstructure assembled with a plurality of interlocking components and comprising: a pair of spaced apart vertical side-posts with a plurality of apertures therein; an end-member extending outwardly from each side-post and interlocked therewith by a plurality of hook members integrally extending from one edge of each end-member; a pair of bendable tab members carried on the upper edge portion of each end-member; a stretcher member interconnecting the side-posts, said member carrying right angularly disposed first and second locking tabs at each end thereof in predetermined spaced apart relation, each of said first locking tabs being in substantial abutting relation against one of the aforesaid hook members, and each of the second locking tabs being recessed, said recessed portion being in interlocked engagement with the corresponding aperture of the side-post; resiliently displaceable means carried by each end-member in substantially abutting relation against the aforesaid stretcher means; and support means with receiving apertures for the aforesaid bendable tab members, which support means becomes integrally interlocked with the end-members when said tab members are forcibly displaced.

References Cited by the Examiner

UNITED STATES PATENTS

| | | | |
|---|---|---|---|
| 1,956,164 | 4/1934 | Voight | 108—152 |
| 3,130,693 | 4/1964 | Shell | 108—108 |

FOREIGN PATENTS 429,511   5/1935   Great Britain.

CLAUDE A. LE ROY, *Primary Examiner.*

J. F. FOSS, *Assistant Examiner.*